C. ALLEN.

Syllabication of Words.

No. 146,631. Patented Jan. 20, 1874.

HOME CONVERSATION.—"Children hunger perpetually for new ideas. They will learn with pleasure from the lips of parents what they deem it drudgery to study in books.

UNITED STATES PATENT OFFICE.

CAMPBELL ALLEN, OF ALBANY, NEW YORK.

IMPROVEMENT IN SYLLABICATION OF WORDS.

Specification forming part of Letters Patent No. 146,631, dated January 20, 1874; application filed May 6, 1873.

*To all whom it may concern:*

Be it known that I, CAMPBELL ALLEN, of the city and county of Albany, in the State of New York, have invented an Improvement in the Syllabication of Words and Accentuation of Syllables in Printed Matter, of which the following is a specification:

This invention relates to designating the syllabication of words of two or more syllables, which syllabication has heretofore been indicated in juvenile books and publications by spacing the syllables from each other. It also relates to designating the accented syllable. The object of this invention is to facilitate instruction in reading the English language, and to enable the learner, whether he be a child or a foreigner learning to read English, to spell and pronounce for himself words of two or more syllables which it is difficult for him to do correctly, unless the syllabication and accentuation are in some way indicated.

The usual method of indicating the proper syllabication is by separating the syllables from each other by a space, which method is liable to several objections. The extended space required renders the spacing method impracticable, except for spelling-books and the simplest juvenile books and publications. The appearance of the page with all the words of two or more syllables thus spaced is not desirable, and, above all, the form of the word as ordinarily printed, with which form it is of the utmost importance that the learner should become familiar, is completely broken up by the spacing between the syllables, which gives the word the appearance of several monosyllabic words, so that in practice pupils who easily pronounce polysyllabic words when spaced off into syllables, have difficulty in recognizing the same words in the ordinary form.

This invention is designed to indicate the syllabication by a method not liable to these objections, and at the same time to indicate the accentuation.

My invention consists in designating the syllabication by the use of a dot or other minute mark placed under or over the final letter of each syllable except the last, or the first letter of each syllable except the first, or under or over the space between the last letter of one syllable and the first letter of the next. I prefer, but do not confine myself to, a dot or other minute mark placed under the final letter of each syllable except the last, unless the last syllable is accented, in which case I place a mark under the last letter of it also.

To designate the accentuation, I use a mark under the accented syllable of a different form from that used under the unaccented syllables. These marks may be of any convenient form.

In the accompanying drawing, which forms part of this specification, the accented syllables are designated by a comma placed under the last letter, while the unaccented syllables have a period.

The printing may be performed, as in the drawing, by the use of quadrats and common punctuation-marks, in which case the designating-marks may be brought as near to the letters as may be desired by using type without any shoulder on the lower side. In practice, however, I prefer to use type cast for the purpose having the designating-mark in connection with the letter in one and the same piece, which peculiarity in the construction of type for the purpose or purposes designated it is my intention to make application for separate Letters Patent.

What is here claimed, and desired to be secured by Letters Patent, is—

The method of indicating the syllabication of words, and accentuation of their syllables, in printed publications by means of marks arranged in relation with their syllables in the manner substantially as herein described.

CAMPBELL ALLEN.

Witnesses:
JNO. TEMPLETON,
WM. S. SHEPARD.